(12) United States Patent
Tadros et al.

(10) Patent No.: US 7,665,942 B2
(45) Date of Patent: Feb. 23, 2010

(54) NAIL WITH MULTIPLE SHANK DEFORMATIONS

(75) Inventors: Mark Tadros, Seekonk, MA (US); Robert D. Moseff, East Providence, RI (US)

(73) Assignee: Stanley Fastening Systems, L.P., East Greenwich, RI (US)

( * ) Notice: Subject to any disclaimer, the term of this patent is extended or adjusted under 35 U.S.C. 154(b) by 185 days.

(21) Appl. No.: 11/651,618

(22) Filed: Jan. 10, 2007

(65) Prior Publication Data
US 2007/0177960 A1    Aug. 2, 2007

Related U.S. Application Data

(60) Provisional application No. 60/757,477, filed on Jan. 10, 2006.

(51) Int. Cl.
*F16B 15/00* (2006.01)
(52) U.S. Cl. .............. 411/451.1; 411/453; 411/455
(58) Field of Classification Search ....... 411/451.1–456
See application file for complete search history.

(56) References Cited

U.S. PATENT DOCUMENTS

| | | | |
|---|---|---|---|
| 2,182 A | 7/1841 | Ballard | |
| 364,439 A * | 6/1887 | Rogers | 411/455 |
| 368,687 A | 8/1887 | Rogers | |
| 895,080 A | 8/1908 | Eisenreich | |
| 1,100,252 A * | 6/1914 | O'Neill | 411/456 |
| 1,194,047 A | 8/1916 | Lynch | |
| 1,444,618 A * | 2/1923 | Levingston | 411/453 |
| 1,529,989 A * | 3/1925 | Devinish | 411/453 |
| 2,001,932 A * | 5/1935 | Maze | 411/454 |
| 2,025,961 A * | 12/1935 | Stone | 411/455 |
| 2,139,279 A * | 12/1938 | Maze | 411/453 |
| 2,226,006 A * | 12/1940 | Maze | 411/453 |
| 2,401,967 A | 6/1946 | Sandberg | |

(Continued)

FOREIGN PATENT DOCUMENTS

DE    4120373 C1    8/1992

(Continued)

OTHER PUBLICATIONS

International Search Report and Written Opinion issued on Aug. 26, 2008 in International Application No. PCT/US2007/000556, filed Jan. 10, 2007.

(Continued)

*Primary Examiner*—Flemming Saether
(74) *Attorney, Agent, or Firm*—Pillsbury Winthrop Shaw Pittman LLP

(57) ABSTRACT

A combination of deformations on a single nail shank provides a nail with optimal withdrawal performance and shear slip resistance. In particular, a nail has a head, a tip, and an elongate shank with a first deformation and a second deformation. The first deformation is positioned closer to the tip. When the nail fastens a first substrate to a second substrate, the first deformation is positioned completely in the second substrate to provide withdrawal resistance from the second substrate. The second deformation intersects the plane between the first and second substrates to provide resistance to shear slip. Moreover, the second deformation makes contact with the inner surface of the bore created by the first deformation.

28 Claims, 4 Drawing Sheets

U.S. PATENT DOCUMENTS

| | | |
|---|---|---|
| 3,106,791 A | 10/1963 | Ball |
| 3,894,469 A | 7/1975 | Nilsson |
| 3,987,698 A | 10/1976 | Rabe |
| 4,718,802 A * | 1/1988 | Rockenfeller et al. ....... 411/421 |
| 4,932,820 A | 6/1990 | Schniedermeier |
| 5,011,354 A * | 4/1991 | Brownlee ................... 411/439 |
| 5,127,785 A | 7/1992 | Faucher |
| 5,391,029 A | 2/1995 | Fardell |
| 5,489,179 A | 2/1996 | Gabriel et al. |
| 5,642,974 A | 7/1997 | Gabriel et al. |
| 5,810,534 A | 9/1998 | Carlisle et al. |
| 6,692,207 B1 * | 2/2004 | Bailey ........................ 411/180 |
| 6,758,018 B2 * | 7/2004 | Sutt, Jr. ................... 52/506.05 |
| 2004/0047713 A1 | 3/2004 | Jung |

FOREIGN PATENT DOCUMENTS

JP        54-82556 A        6/1979

OTHER PUBLICATIONS

"Fastap Poly 3: The Next Generation Poly Screw Made Expressly for The Harder Wood/Poly Composite Lumber." Fastap Self Drilling Screw Products. Dec. 16, 2006. <http://www.fastapscrews.com/fts/one/products/poly3_a.htm>. pp. 1-2.

* cited by examiner

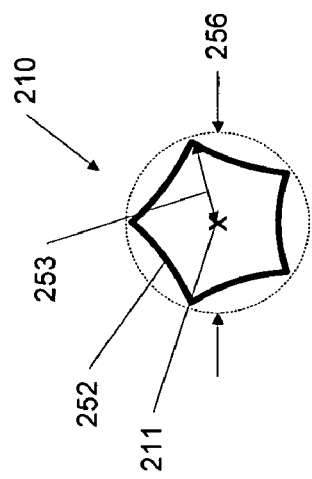
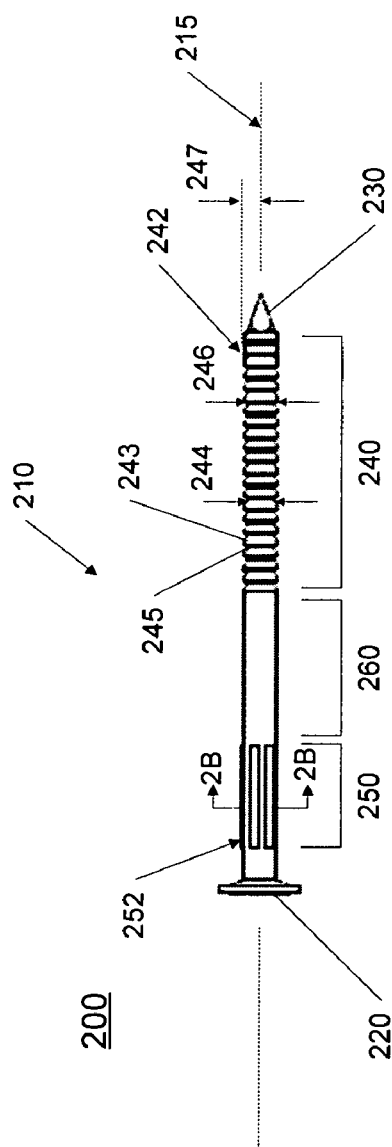

NAIL WITH MULTIPLE SHANK DEFORMATIONS

CROSS REFERENCE TO RELATED APPLICATIONS

This application claims priority to U.S. Provisional Application No. 60/757,477 and filed Jan. 10, 2006, the contents of which are incorporated herein by reference.

BACKGROUND OF INVENTION

1. Technical Field

The present invention relates to nails. More particularly, the present invention relates to nails employing a combination of nail shank deformations to prevent axial withdrawal and shear slip.

2. Description of Related Art

Generally, in order to keep two or more objects fastened together, a nail must resist axial forces that act to separate the objects along the nail's longitudinal axis. In order to prevent axial separation, the friction between the surface of the nail shank and the inner surfaces of the bores in contact with the nail shank must be sufficient to resist the axial separating forces. With the nail as the frame of reference, an axial separating force acts on the nail in a direction toward the nail head, but friction acts in the opposite direction to keep the nail from moving relative to one or more of the fastened objects. When the friction is insufficient to resist an axial separating force acting on the nail, the forces can cause the nail to withdraw, or back out, from a bore in a fastened object.

A known problem with nails is their inability to resist withdrawal from the base materials into which they are driven. A common method to improve a nail's ability to resist withdrawal, also referred to as withdrawal performance, is to create mechanical deformations on the surface of the nail shank to increase the frictional resistance to axial forces along the shank and the bore surfaces.

One way to create mechanical deformations on the shank surface of a nail involves forming a series of annular rings axially spaced along the shank. In many applications, these ringed deformations provide good resistance to withdrawal. However, in addition to providing resistance to axial forces, a nail must also resist shear forces that act to move the objects relative to each other in a direction perpendicular to the nail's longitudinal axis. In this regard, the use of ringed deformations is often accompanied by a reduction in the nail's ability to resist movement of the fastened objects in a direction perpendicular to the nail's longitudinal axis, also known as shear slip. The annular rings generally have an outer diameter that is larger than the un-deformed sections of the shank. As a nail with annular rings on its shank is driven into a base material, the outer diameter of the annular rings creates an annular gap where the bore is larger than the diameter of the un-deformed sections of the shank. As a result, when a shear force acts on a fastened object where an annular gap exists, the nail can only resist the shear force when the object moves enough to allow the shank of the nail to make contact with the inner surface of the bore, which has a larger diameter.

Another way to create mechanical deformations on the shank surface involves forming a threaded, or screw-shaped, deformation. The helical pattern of a threaded nail shank creates corresponding helical channels in the object into which the nail is being driven. The nail rotates in one direction as it moves through the object, and the threaded deformation on the nail only travels within the helical channels in the object. Meanwhile, the other sections of the bore surface remain in contact with the rest of the shank. Thus, no annular gap is created, providing better shear slip performance than a nail with annular rings. Moreover, a nail with a threaded deformation encounters less resistance than a nail with annular rings when it is being driven into an object. However, a nail with a threaded deformation, though more effective than a nail without deformation, is still susceptible to withdrawal. A nail with a threaded deformation can slowly spin out of the base material, when forces, such as those resulting from vibration, cause the nail to rotate counter to its driving rotation, i.e., the direction it rotates when being driven into the base material.

BRIEF SUMMARY OF THE INVENTION

The present invention employs a combination of deformations on a single nail shank in order to provide a nail with optimal withdrawal performance and shear slip resistance.

One embodiment of the present invention has a head, a tip, and an elongate shank with a ringed section and a threaded section. The ringed section is positioned closer to the tip and has at least one annular ring shaped to extend radially outward from the longitudinal axis of the shank. The threaded section is closer to the head and has at least one ridge shaped to form a helix around the longitudinal axis of the shank. In a specific embodiment, an un-deformed section of the shank is positioned axially between the ringed section and the threaded section, because the ringed section is dimensioned and positioned on the shank to keep the ringed section from intersecting any shear plane. Preferably, when the nail fastens a first substrate to a second substrate, the ringed section is positioned completely in the second substrate to provide withdrawal resistance from the second substrate. Also preferably, the threaded section intersects the plane between the first and second substrates to provide resistance to shear slip.

Another embodiment of the present invention has a head, a tip, and an elongate shank with a ringed section and a ribbed section. The ringed section is positioned closer to the tip and has at least one annular ring shaped to extend radially outward from the longitudinal axis of the shank. The ribbed section is closer to the head and has at least one axially elongate rib shaped to protrude transversely outward. Preferably, when the nail fastens a first substrate to a second substrate, the ringed section is positioned completely in the second substrate to provide withdrawal resistance from the second substrate. Also preferably, the ribbed section intersects the plane between the first and second substrates to provide resistance to shear slip.

Another embodiment of the present invention has a head, a tip, and an elongate shank with a threaded section and a ribbed section. The threaded section is closer to the tip and has at least one ridge shaped to form a helix around the longitudinal axis of the shank. The ribbed section is closer to the head and has at least one axially elongate rib shaped to protrude transversely outward. The threaded section provides withdrawal resistance. The ribbed section prevents the threaded section from spinning out of the bore. Both the threaded section and the ribbed section can provide resistance to shear slip.

Yet another embodiment of the present invention has a head, a tip, and an elongate shank with a threaded section and a counter-threaded section. The first threaded section is closer to the tip and has at least one ridge shaped to form a helix around the longitudinal axis of the shank. The counter-threaded section is closer to the head and also has at least one ridge shaped to form a helix around the longitudinal axis of the shank. However, the threaded section and the counter-threaded sections have opposite driving rotations. Both the threaded section and the counter-threaded sections provide withdrawal resistance and improve resistance to shear slip. Their opposing driving rotations prevent either section from spinning out of the bores.

Another embodiment of the present invention is employed in a sheathing application. A portion of the threaded section in an exemplary embodiment is axially positioned to intersect the expected shear plane between the sheathing substrate and the frame member, with at least approximately 10% of the total nail length axially on each side of this intersection position. This positioning of the threaded section, particularly with the 10% of the total nail length on each side, ensures that the threaded section intersects the anticipated shear plane between the sheathing substrate and the frame member. Meanwhile, the ringed section in the exemplary embodiment is spaced axially at least approximately 25% of the total nail length from the anticipated intersection position. The axial spacing of the ringed section ensures that the ringed section will not intersect the shear plane.

These and other aspects of the present invention will become more apparent from the following detailed description of the preferred embodiments of the present invention when viewed in conjunction with the accompanying drawings.

BRIEF SUMMARY OF THE DRAWINGS

FIG. 2A illustrates a nail with annular rings on one section of the nail shank and axially elongate ribs on another section of the nail shank.

FIG. 2B illustrates a cross-sectional view of the shank at the threaded section for the exemplary embodiment of FIG. 2.

DETAILED DESCRIPTION

The present invention employs a combination of deformations on a single nail shank in order to provide a nail with optimal withdrawal performance and shear slip resistance.

Figure 1D:
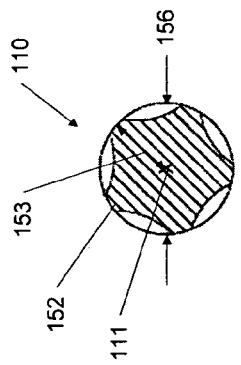
FIG. 1D illustrates a cross-sectional view of the shank at the threaded section for the exemplary embodiment of FIG. 1.
Figure 1B:
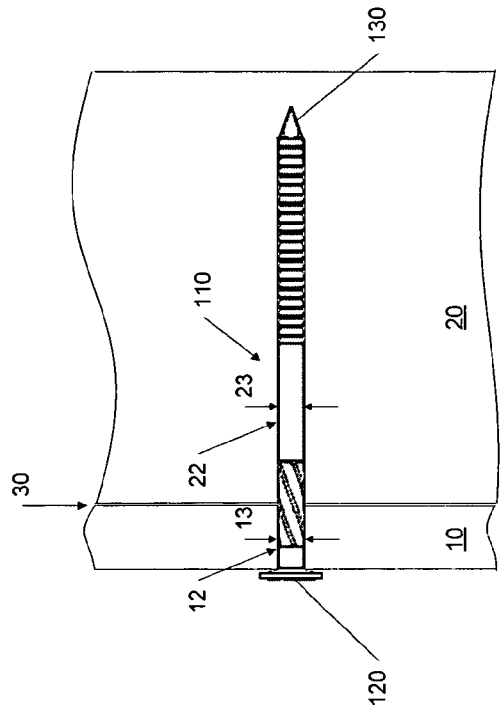
FIG. 1B illustrates the exemplary embodiment of FIG. 1A fastening two substrates, as in a sheathing application.
Figure 1A:
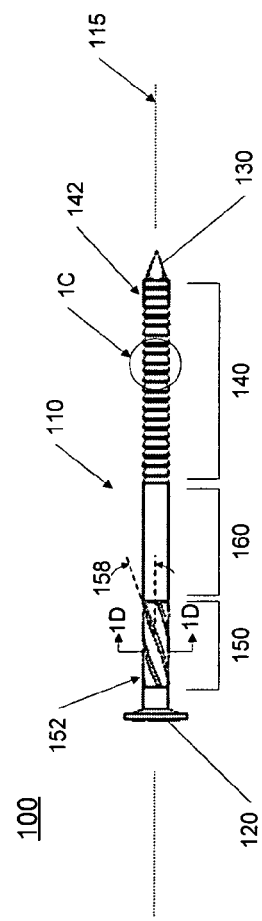
FIG. 1A illustrates a nail with annular rings on one section of the nail shank and a threaded deformation on another section of the nail shank.

FIG. 1A illustrates an exemplary embodiment of the present invention. As FIG. 1A shows, the nail 100 has an elongate shank 110 forming a longitudinal axis 115. The nail 100 has an enlarged head 120 at one end of the shank 110 adapted to receive a force for driving the nail 100 into one or more substrate materials. The head 120 may be an enlarged head of the type, for instance, generally described in U.S. Pat. No. 6,758,018 issued on Jul. 6, 2004, the contents of which are incorporated herein by reference. The nail 100 also has a tip 130 adapted to enter one or more base materials when the driving force is received at the head 120. As an example, FIG. 1B illustrates the nail 100 fastening a first substrate 10 to a second substrate 20. In a sheathing application, for instance, the first substrate 10 might be plywood, or another sheathing substrate, while the second substrate 20 might be a 2-by-4, or a similar framing member.

As also illustrated in FIG. 1A, the shank 110 has a ringed section 140 closer to the tip 130. The ringed section 140 has a series of axially spaced annular rings 142 with their outermost edges extending radially outward. In the manner described previously, the annular rings 142 prevent withdrawal of the nail 100 from the substrate in which the annular rings 142 are driven.

Figure 1C:
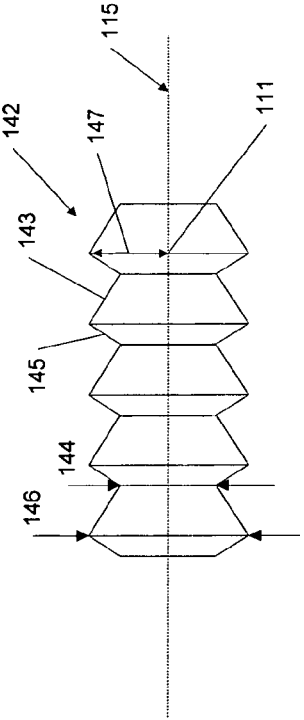
FIG. 1C illustrates the annular rings of the exemplary embodiment of FIG. 1A.

As shown in FIG. 1C, each of the annular rings 142 has a frusto-conical, leading surface 143 facing toward the tip 130 defining an acute angle, approximately 20 to 25 degrees, relative to the longitudinal axis 115. Each annular ring 142 also has a frusto-conical, trailing surface 145 facing toward the head and defining a larger acute angle, approximately 65 to 70 degrees, relative to the longitudinal axis 115. In an exemplary embodiment, the angle between the leading surface 143 and the trailing surface 145 it faces is 90 degrees. The shape of the annular rings 142, however, is not limited to the shape illustrated in the exemplary embodiment of FIG. 1A. For instance, the leading surface 143 and the trailing surface 145 of the annular rings 142 along the ringed section 140 may have varying angles with respect to the longitudinal axis 115. The shape of the annular rings is influenced by a balance of several factors, which include, but are not limited to, desired withdrawal performance, the driving force, and the life of the tool for making the nail. When the angle of the leading surface 143 is small, there may be insufficient withdrawal resistance. However, if the angle of the leading surface 143 is large, the force required to drive the nail may be too high. Moreover, the life of the tool used to make the nail is affected by the angle. For instance, a leading surface 143 with an angle of 25 degrees may result in a longer tool life, compared to a leading surface with an angle of 20 degrees, because the material flows more easily within a tool die with an angle of 25 degrees.

As also shown in FIG. 1C, the annular rings 142 have an inner ring diameter 144 at the root and an outer ring diameter 146 at the outermost edge. Applying the most common manufacturing processes, the size of the outer ring diameter 146 generally has an approximately inverse relationship to the size of the inner ring diameter 144. When the nail 100 is formed from an un-deformed blank, material is drawn outward from the shank of the un-deformed blank to form the annular rings 142. As the annular rings 142 are drawn outward to greater outer diameters, more material flows away from the center, causing the inner ring diameter 144 to decrease. Thus, the inner ring diameter 144 decreases as the outer ring diameter 146 increases.

Because the bending resistance, or column strength, of a nail weakens as the inner ring diameter 144 decreases, forming annular rings with a very large outer ring diameter 146 will leave a very small inner ring diameter 144 and reduce the bending resistance of the nail 100. Bending resistance increases when the moment of inertia of a nail shank cross-section increases. Thus, because the moment of inertia of the nail shank cross-section decreases as the diameter decreases, there is less moment of inertia to resist bending where the diameter of the shank 110 is inner ring diameter 144. As a result, the outer ring diameter 146 is restricted to a size that will also ensure that the nail 100 has sufficient bending resistance where the shank diameter is equal to the inner ring diameter 144.

The life of the tool used to make the nail 100 is also an important factor in determining the size of the outer ring diameter 146. As the annular ring 142 is configured for a larger outer ring diameter 146, the tool life is generally shortened, because the tool die is required to cause the flow of more material radially outward. Preferably, the size of the outer ring diameter 146 is limited to approximately 13% to 15% over the diameter of the un-deformed blank to minimize tool wear while providing sufficient withdrawal performance.

A further consideration in the sizing of the outer ring diameter 146 is also the amount of the force required to drive the nail 100. A greater outer ring diameter 146 may require larger driving forces.

Although the inner ring diameter 144 and the outer ring diameter 146 may be substantially equal for each ring 142 along the ringed section 140 as shown in FIGS. 1A and 1C, other embodiments may have rings with varying inner and outer ring diameters. In particular, the ringed section may be tapered where the outer ring diameters increase as the ringed section extends from the tip toward the head. An example of a series of rings with varying dimensions along a ringed section is described in U.S. patent application Ser. No. 11/189,012 filed on Jul. 26, 2005, the contents of which are incorporated herein by reference.

As shown in FIGS. 1A and 1C, the annular rings 142 are immediately adjacent to each other, essentially forming a continuous series of rings for the entire axial length of the ringed section 140. In an exemplary embodiment, the number of annular rings per inch is 20 rings per inch. However, the axial spacing between the rings 142 is determined by a combination of factors and is not limited to the spacing illustrated in this embodiment. There may be approximately 12 to 32 rings per inch, or more preferably, approximately 16 to 32 rings per inch. The outer ring diameter 146 is related to the number of rings per inch, because constraints on the flow of material during manufacturing make it more difficult to achieve greater outer ring diameters with more rings per inch. Although tool life may benefit from a reduction of the outer ring diameter 146 corresponding with more rings per inch, tool wear, on the other hand, can increase when there are more rings per inch, because the material does not flow as easily within the tool die. Indeed, tool life becomes a less significant factor when there are approximately 10 rings per inch, because the flow of material within the tool is facilitated by the very large spacing between rings.

Although the embodiment illustrated in FIG. 1A shows a specific number of annular rings 142 on the first surface 140, the present invention is not limited to a specific number. The number of annular rings 142 depends on the amount of withdrawal resistance desired, as each ring provides incremental resistance. Referring to the example in FIG. 1A, even though a high number of annular rings 142 may prevent withdrawal of the nail from the second substrate 20, the nail 100 may not be able to exert enough axial resistance within the first substrate 10 to keep the first substrate 10 from separating from the second substrate 20 by, for example, failure of the nail head material or the substrate 10. In this scenario, the axial resistance within the first substrate 10 fails before the withdrawal resistance fails within the second substrate 20.

Moreover, a high number of annular rings can have a negative impact on the bending resistance of the nail 100. As described previously, the creation of the annular rings 142 causes a reduction in the shank diameter to an inner ring diameter 144 at the root of the rings 142, resulting in less moment of inertia to resist bending. Thus, the number of annular rings 142 selected preferably provides sufficient withdrawal performance, while at the same time the number of rings is limited to minimize the axial length of the ringed section 140, where bending resistance is weakened by the smaller diameter, and thus smaller cross-section at the root of the rings 142.

As further illustrated by FIG. 1A, the shank 110 also has a threaded section 150 closer to the head 120. The threaded section 150 has a series of circumferentially spaced ridges 152 shaped to form helixes around longitudinal axis 115. In other words, each helix formed by the ridges 152 lies on an imaginary cylinder which has an axis substantially parallel to the longitudinal axis 115. As explained further below, the threaded section improves both withdrawal performance and shear slip resistance.

The threaded section 150, in general, may be axially adjacent to the head 120 and may extend axially to the ringed section 140. In some instances, a threaded section 150 of greater axial length may be advantageous in the manufacturing of the nail 100. For instance, a longer threaded section 150 creates more area for the manufacturing die to hold and reduces the movement of the nail 100 within the die.

Depending on manufacturing considerations, an axial gap 160 of approximately ⅛-inch may be required between the threaded section 150 and ringed section 140. However, the substantially cylindrical (un-deformed) section 160 between the threaded section 150 and the ringed section 140 may be larger.

FIG. 1D shows a cross-sectional view of the shank 110 at the threaded section 150. The transverse cross-section, in a plane perpendicular to the longitudinal axis 115, shows an outer thread diameter 156. Each portion of the threaded section 150 has a ridge dimension 153 that extends radially outward from a shank center 111, and the outer thread diameter 156 is equal to twice the ridge dimension 153. The outer thread diameter 156 is preferably greater than the outer ring diameter 146 of the annular rings 142, but the outer thread diameter 156 should be at least equal to the outer ring diameter 146. In other words, the ridge dimension 153 is greater than or equal to the outer ring radius 147 measured from the shank center 111, as shown in FIG. 1C. Thus, the threaded section 150 makes contact with the inner surface of the bores created by the nail 100.

In embodiments where the outer ring radius is not equal for all rings along the ringed section, the ridge dimension along the threaded section is preferably greater than or equal to the largest outer ring radius. In this way, the threaded section makes contact with the inner surface of the bore created by the largest outer ring radius.

Furthermore, although the ridge dimension 153 appears to be substantially constant along the threaded section 150 in FIGS. 1A and 1D, the ridge dimension in other embodiments may vary along the threaded section. In particular, the threaded section may be tapered where the ridge dimension progressively increases as the threaded section extends toward the head of the nail. In general, the ridge dimension all along the threaded section is preferably greater than or equal to the largest outer ring radius. In this way, each portion of the threaded section makes contact with the inner surface of the bore created by the largest outer ring radius.

As with the ringed section 140, the life of the driving tool is also an important factor in determining the size of the outer thread diameter 156 of the threaded section 150. As the deformation increases, the expected tool life becomes shorter. Generally, the outer thread diameter 156 is limited to approximately 13% to 15% over the diameter of the un-deformed blank to minimize tool wear. In other words, the ridge dimension 153 is limited to approximately 13% to 15% over the radius of the un-deformed blank.

A thread angle 158 is defined by the longitudinal axis 115 and the helical ridges 152. Although the thread angle of the present invention is not limited to a particular value, the thread angle of an exemplary embodiment is approximately 18 to 20 degrees, though the thread angle may generally range from 12 to 30 degrees. Greater angles may lead to weakening of the nail 100 during manufacturing and require greater forces to drive the nail. On the other hand, angles smaller than 12 degrees generally provide too little withdrawal resistance. In this exemplary embodiment, a thread angle of 20 degrees provides withdrawal performance and requires reasonable driving force, though as described below, a more significant purpose for this threaded section is to prevent shear slip.

The use of the nail 100 is illustrated by reference to the exemplary assembly shown in FIG. 1B. When a driving force is received at the enlarged head 120, the tip 130 enters the first substrate 10. As the nail 100 is driven further, the ringed section 140 enters the first substrate 10 and a first bore 12 is created in the first substrate 10. Because the annular rings 142 have an outer ring diameter 146, the first bore 12 created in the first substrate 10 will have a diameter 13 substantially equal to the outer ring diameter 146. The ringed section 140 then follows the tip 130 into the second substrate 20, creating a second bore 22 with a diameter 23 substantially equal to the outer ring diameter 146. As the nail 100 moves through the substrates 10 and 20, the threaded section 150 follows the ringed section 140. Because the outer thread diameter 156 along the threaded section 150 is greater than or equal to the largest outer ring diameter 146, the outer edge of the helical ridges 142 makes contact with the inner surface of the bores 12 and 22. The contact between the helical ridges 142 and the bores 12 and 22 causes the nail 100 to rotate as the nail moves through the substrates 10 and 20. The helical ridges 142 create helical channels in the bores 12 and 22 as the nail 100 moves through the substrates 10 and 20, particularly if, as preferred, the outer thread diameter 156 is greater than the largest outer ring diameter 146. The helical ridges 142 move through these channels.

FIG. 1B illustrates the final assembly of the nail 100, the first substrate 10, and the second substrate 20, once the nail 100 is completely driven into the substrates 10 and 20. The ringed section 140 with annular rings 142 is completely positioned in the first substrate 10. A part of the threaded section 150 with helical ridges 152 is positioned in the first substrate 10, while another part of the threaded section 150 is positioned in the second substrate 20. A shear plane 30 exists in the plane, generally perpendicular to the longitudinal axis 115 of the nail 100, where the first substrate 10 and second substrate 20 abut. Thus, the threaded section 150 intersects the shear plane 30. The threaded section 150 in the second substrate 20 provides withdrawal resistance for the nail 100 in the second substrate 20. In addition, the threaded section 150 in the first substrate 10 improves resistance to axial forces that act against first substrate 10 in the direction of the nail head 120.

Moreover, because the outer edge of the helical ridge 152 with the outer thread diameter 156 remains in contact with the inner surface of the bore, the threaded section 150 helps to resist shear forces that act to move the first substrate 10 and the second substrate relative to each other along the shear plane 30. In particular, the resistance to shear slip is greater when the outer thread diameter 156 is greater than the largest outer ring diameter 146 and there is more contact area between the threaded section 150 and the inner surface of bores 12 and 22.

As discussed above, FIG. 1B can illustrate the use of the nail 100 in a sheathing application. When using a standard 2½ inch nail for a sheathing application, a portion of the threaded section 150 in an exemplary embodiment is axially positioned approximately ½-inch from the head 120 (about 20% of the total nail length), with at least ¼-inch of the threaded section 150 (about 10% of the total nail length) axially on each side of this ½-inch position. This positioning of the threaded section 150, particularly with the ¼-inch of the threaded section 150 on each side, ensures that the threaded section 150 intersects the anticipated shear plane between the sheathing substrate and the frame member. Meanwhile, the ringed section 140 in the exemplary embodiment is spaced axially at least approximately 0.7 inches (about 28% of the total nail length) from the anticipated shear plane, or approximately 1.2 inches (about 48% of the total nail length) from the head 120. The axial position of the ringed section 140 ensures that the ringed section 140 will not intersect the shear plane.

In general, the nail 100 employs the threaded section 150 in addition to the ringed section 140. While ringed section 140 resists withdrawal from the second substrate 20, the threaded section 150 is positioned in the shear slip plane and sized to improve shear slip performance. Additionally, a part of the threaded section 150 improves withdrawal performance in the second substrate 20, and the other part of threaded section 150 improves resistance to forces that act against first substrate 10 in the direction of the nail head 120, tending to cause pull-through.

However, as illustrated in FIG. 2A, other deformations can be used in conjunction with a ringed section positioned near the tip. In particular, the nail 200 in FIG. 2A has an elongate shank 210 employing a ribbed section 250 with a ringed section 240.

The ringed section 240 of shank 210 is the same as the ringed section 140 of the nail 100 illustrated in the embodiment of FIG. 1A. In the manner described previously, annular rings 242 of the ringed section 240 prevent withdrawal of the nail 200 from the substrate into which the annular rings 242 are driven. There is generally also a substantially cylindrical (un-deformed) section 260 between the threaded section 250 and the ringed section 240, particularly if the ringed section 240 is spaced axially to prevent any intersection with the shear plane.

The ribbed section 250 of the shank 210 has a series of circumferentially spaced axially elongate ribs 252 protruding transversely outward. An exemplary embodiment has 5 axially elongate ribs 252, but the number of ribs is not limited by this embodiment. In general, more axial ribs may be disadvantageous due to manufacturing considerations.

FIG. 2B shows a cross-sectional view of the shank 210 at the ribbed section 250. The transverse cross-section, in a plane perpendicular to the longitudinal axis 215, shows an outer ribbed section diameter 256. Each portion of the ribbed section 250 has a rib dimension 253 that extends radially outward from a shank center 211, and outer rib diameter 256 is equal to twice the rib dimension 253. The outer ribbed section diameter 256 of the ribbed section 250 is preferably greater than the largest outer ring diameter 246 of the annular rings 242, but the outer ribbed section diameter 256 should be at least equal to the largest outer ring diameter 246 so that the ribbed section 250 makes contact with the inner surface of the bores created by the ringed section 240. In other words, the rib dimension 253 is greater than or equal to the largest outer ring radius 247 measured from the shank center 211, as shown in FIG. 2A. The contact between the axial ribs 252 and the inner surface of the bores creates axial channels in the bores as the nail 200 is driven through, particularly if, as preferred, the outer ribbed section diameter 256 is greater than the largest outer ring diameter 246.

As with the ringed section 240, the life of the tool used to make the nail 200 is an important factor in determining the size of the outer ribbed section diameter 256 of the ribbed section 250. As the deformation increases, the expected tool life becomes shorter, because the tool die is required to cause the flow of more material radially outward. Preferably, the size of the outer ribbed section diameter 256 is limited to approximately 13% to 15% over the diameter of the un-deformed blank to minimize tool wear while providing sufficient withdrawal performance. In other words, the rib dimension 253 is limited to approximately 13% to 15% over the radius of the un-deformed blank.

Although the rib dimension 253 may be constant along the ribbed section 250 as shown in FIGS. 2A and 2D, the rib dimension in other embodiments may vary along the ribbed section. In particular, the ribbed section may be tapered where the rib dimension progressively increases as the ribbed section extends toward the head of the nail. In general, the rib dimension along the ribbed section is preferably greater than or equal to the largest outer ring radius. In this way, the ribbed section makes contact with the inner surface of the bore created by the largest outer ring radius.

Preferably, the ribbed section 250 is positioned axially along the shank 210 when the nail 200 is completely driven into the fastened objects, so that the ribbed section intersects the shear plane between two fastened objects. A part of the ribbed section 250 with axial ribs 252 is then positioned in one of the fastened objects, while another part of the ribbed section 250 is positioned in the second fastened object. Moreover, the ribbed section 250 helps to resist shear forces that act to move the two fastened objects relative to each other along the shear plane. In particular, the resistance to shear slip is greater when the outer rib diameter 256 is greater than the largest outer ring diameter 246, creating more contact area between the ribbed section 150 and the inner surface of bores.

Thus, the nail 200 employs the ribbed section 250 in addition to the ringed section 240. While ringed section 240 resists withdrawal from one of the fastened objects, the ribbed section 250 is positioned in the shear slip plane and sized to improve shear slip performance.

Figure 3B:
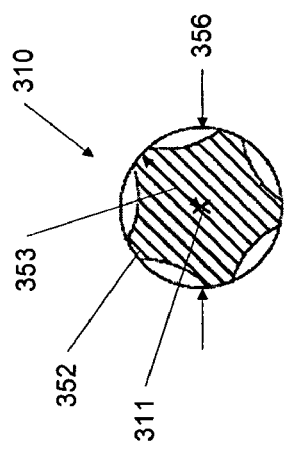
FIG. 3B illustrates a cross-sectional view of the shank at the threaded section for the exemplary embodiment of FIG. 3.
Figure 3C:
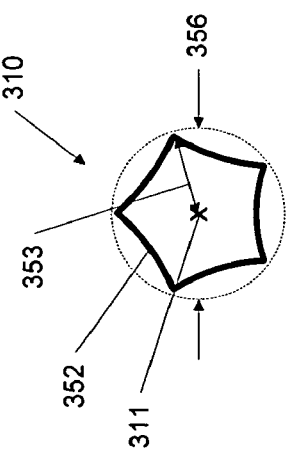
FIG. 3C illustrates a cross-sectional view of the shank at the ribbed section for the exemplary embodiment of FIG. 3.
Figure 3A:
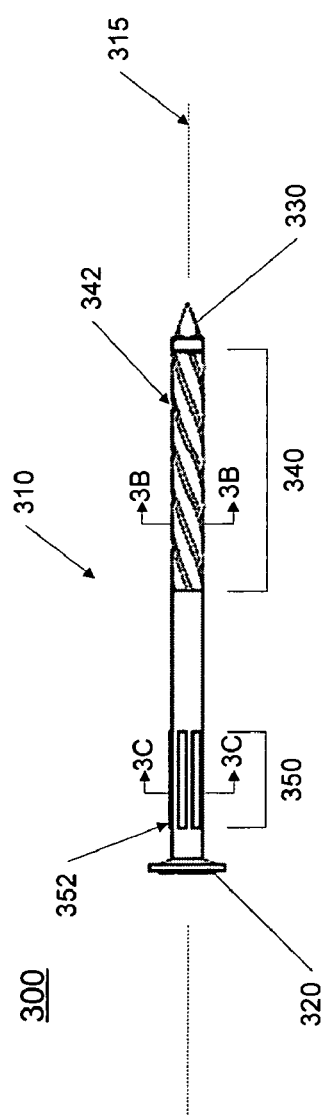
FIG. 3A illustrates a nail with a threaded deformation on one section of the nail shank and axially elongate ribs on another section of the nail shank.

FIG. 3A illustrates another embodiment of the present invention. As FIG. 3A shows, the nail 300 has an elongate shank 310 forming a longitudinal axis 315. The nail 300 has an enlarged head 320 at one end of the shank 310 adapted to receive a force for driving the nail 300 into one or more base materials. The nail 300 also has a tip 330 adapted to enter one or more base materials when the driving force is received at head 320.

The shank 310 has a threaded section 340. The threaded section 340 has a series of circumferentially spaced ridges 342 shaped to form helixes around longitudinal axis 315. In other words, each helix formed by the ridges 342 lies on an imaginary cylinder which has an axis substantially parallel to the longitudinal axis 315. In general, except as indicated otherwise hereinbelow, the threaded section 340 is similar to the threaded section 150 described previously.

FIG. 3B shows a cross-sectional view of the shank 310 at the threaded section 340. The transverse cross-section, in a plane perpendicular to the longitudinal axis 315, shows an outer thread diameter 346. Each portion of the threaded section 340 has a ridge dimension 343 that extends radially outward from a shank center 311, and outer thread diameter 346 is equal to twice the ridge dimension 343.

When a driving force is received at the enlarged head 320, the tip 330 enters a base material. As the nail 300 is driven further to create a bore in the substrate, the helical ridges 342 cause the nail 300 to rotate, creating helical channels in the bore. The helical ridges 342 move through these channels as the nail 300 moves through the substrate. In the manner discussed previously, the threaded section 340 helps prevent axial withdrawal.

As shown in FIG. 3A, the shank 310 also has a ribbed section 350, where a series of circumferentially spaced axial ribs 352 protrude radially outward. In general, except as indicated otherwise hereinbelow, the ribbed section 350 is similar to the ribbed section 250 described previously. The transverse cross-sectional view of FIG. 3C of the shank 310 in the ribbed section 350 shows an outer ribbed section diameter 356. The outer ribbed section diameter 356 is greater than or equal to the largest outer thread diameter 356, so that the ribbed section 350 makes contact with the inner surface of the bore created by the threaded section 340. In other words, each portion of the ribbed section 340 has a rib dimension 353 that extends radially outward from a shank center 311, and the outer thread diameter 356 is equal to twice the rib dimension 353. The outer ribbed section diameter 356 of the ribbed section 350 is preferably greater than the largest outer thread diameter 346 of the helical ridges 342, but the outer ribbed section diameter 356 should be at least equal to the largest outer thread diameter 346 so that the ribbed section 350 makes contact with the inner surface of the bores created by the nail 300. In other words, the rib dimension 353 is greater than or equal to the largest ridge dimension 343 measured from the shank center 311, as shown in FIG. 2A.

In alternative embodiments where the rib dimension is not constant along the ribbed section and/or the ridge dimension is not constant along the threaded section, the rib dimension all along the ribbed section is preferably greater than or equal to the largest ridge dimension, in order to ensure contact between the ribbed section and the bore created by the threaded section.

The axial ribs 352 resist rotation by the nail 300. The resistance is particularly greater when the outer ribbed section diameter 356 is greater than the largest outer thread diameter 356 and the contact area between the ribbed section 350 and the bore surface is greater. Thus, the axial ribs 352 improve the withdrawal performance of the nail 300, because they prevent the threaded section 340 from spinning out of the bore when forces encourage the nail 300 to spin counter to its driving rotation, i.e., the direction it rotates when being driven into the base material. Furthermore, because the axial ribs 352 maintain contact with the inner surface of the bore, the ribbed section 350 also adds to the ability of nail 300 to resist shear slip. Preferably, the ribbed section 350 is positioned in the shear plane between two fastened objects to improve shear slip resistance.

Figure 4:
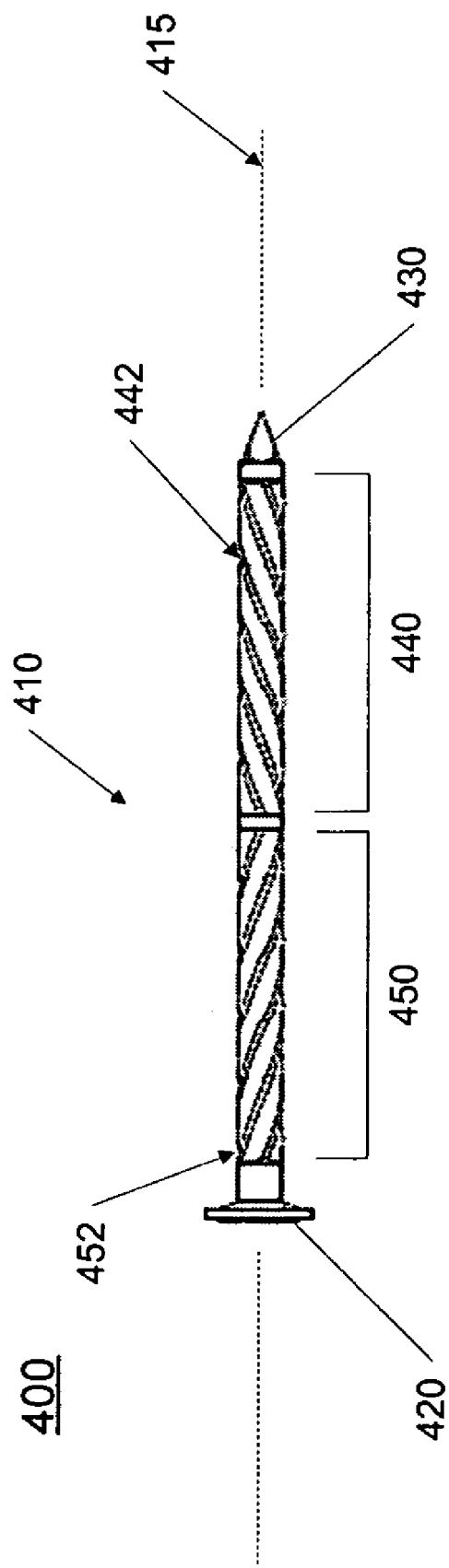
FIG. 4 illustrates a nail with a threaded deformation with one angle on one section of the nail shank and a threaded deformation with an opposing angle on another section of the nail shank.

Alternatively, another type of second deformation can be employed in place of the ribbed section 350 illustrated in the embodiment in FIG. 3A. As illustrated in FIG. 4, the nail 400 has an elongate shank 410 with a threaded section 440 that is the same as the threaded section 340 in the embodiment illustrated in FIG. 3A. However, nail 400 employs a counter-threaded section 450 to prevent the threaded section 440 from withdrawing. Due to manufacturing considerations, threaded section 440 and counter-threaded section 450 may be axially separated by an un-deformed section of the shank.

Like the threaded section 440, the counter-threaded section 450 has a series of circumferentially spaced ridges 452 shaped to form helixes around longitudinal axis 415. However, the driving rotation of the counter-threaded section 450 is opposite to the driving rotation of the threaded section 440. The outer thread diameter 456 of the counter-threaded section 450 is greater than or equal to the largest outer thread diameter 446 of the threaded section 440, so that the counter-threaded section 450 maintains contact with the bore surface created by the threaded section 440.

The ridges 452 resist rotation by the threaded section 440. The resistance is particularly greater when the outer thread diameter 456 of the counter-threaded section 450 is greater than the largest outer thread diameter 446 of the threaded section 440, making the contact area between the counter-threaded section and the bore surface greater. Thus, the ridges 452 improve the withdrawal performance of the nail 400, because they prevent the threaded section 440 from spinning out of the bore when forces encourage the nail 400 to spin opposite to driving direction for threaded section 440. Furthermore, because the ridges 452 maintain contact with the inner surface of the bore, the counter-threaded section 450 also adds to the ability of nail 400 to resist shear slip. Preferably, the counter-threaded section 450 is positioned in the shear plane between two fastened objects to improve shear slip resistance.

Although the embodiments described hereinabove employ combinations of two deformed shank sections, the present invention is not limited to the use of two deformed shank sections. Moreover, the present invention is not limited to the fastening of two objects. For example, a nail embodying the present invention can fasten three objects by implementing three deformed sections, where two of the sections intersect the two shear planes to resist shear slip. In addition, as discussed previously, the present invention is not limited to the use of deformed sections which have deformations of a constant outer diameter. The diameters of the deformations may vary as long as there is sufficient contact between the deformations in the deformed section and the inner surface of the bore to provide withdrawal and shear slip resistance. For instance, the deformations may be tapered with increasing diameters from tip to head, or portions of a deformed section can have different diameters.

What is claimed is:

1. A nail, comprising:
    an elongate shank with a longitudinal axis, a first end, and a second end;
    a head positioned at the first end;
    a tip positioned at the second end;
    at least one annular ring formed on the shank and extending radially outward;
    at least one ridge formed on the shank and defining a helix around the longitudinal axis; and
    an axial gap between the at least one ridge and the at least one ring,
    wherein the at least one ridge is positioned axially between the head and the at least one annular ring.

2. The nail according to claim 1, wherein the at least one annular ring comprises a series of axially spaced annular rings.

3. The nail according to claim 2, wherein the series of axially spaced annular rings comprises a series of annular rings immediately adjacent to each other.

4. The nail according to claim 2, wherein the series of axially spaced annular rings comprises approximately 16 to 32 rings per inch along the longitudinal axis.

5. The nail according to claim 1, wherein he at least one ring comprises a frusto-conical leading surface facing the tip.

6. The nail according to claim 5, wherein the frusto-conical leading surface forms an acute angle approximately equal to 20 to 25 degrees relative to the longitudinal axis.

7. The nail according to claim 5, wherein the at least one ring further comprises a frusto-conical trailing surface facing the head.

8. The nail according to claim 7, wherein the frusto-conical trailing surface forms an acute angle approximately equal to 65 to 75 degrees relative to the longitudinal axis.

9. The nail according to claim 7, wherein the frusto-conical leading surface and the frusto-conical trailing surface form a 90-degree angle therebetween.

10. The nail according to claim 1, wherein the nail is drawn from an un-deformed blank with a blank diameter, and the at least one ring has an outer ring diameter that is approximately 13% to 15% over the blank diameter.

11. The nail according to claim 1, wherein the at least one ridge formed on the shank comprises a series of circumferentially spaced ridges shaped to form helixes around the longitudinal axis.

12. The nail according to claim 1, wherein the axial gap is approximately ⅛-inch.

13. The nail according to claim 1, wherein the at least one ridge extends radially outward for a ridge dimension measured from a shank center, the at least one ring has an outer ring radius measured from the shank center, and the ridge dimension is greater than or equal to the outer ring radius.

14. The nail according to claim 1, wherein the nail is drawn from an un-deformed blank with a blank radius, the at least one ridge extends radially outward for a ridge dimension measured from a shank center, and the ridge dimension is approximately 13% to 15% over the blank radius.

15. The nail according to claim 1, wherein the at least one ridge forms a thread angle with the longitudinal axis, and the thread angle is approximately 18 to 20 degrees.

16. The nail according to claim 1, wherein the axial gap between the at least one ridge and the at least one ring has a smooth surface.

17. A fastened assembly, comprising:
    a nail, comprising:
        an elongate shank with a longitudinal axis, a first end and a second end;
        a head positioned at the first end;
        a tip positioned at the second end;
        a first deformation formed on the shank;
        a second deformation formed on the shank and positioned between the head and the first deformation, the second deformation comprising at least one ridge defining a helix around the longitudinal axis; and
        an axial gap between the first deformation and the second deformation;
    a first substrate; and
    a second substrate,
    wherein the nail fastens the first substrate in abutment with the second substrate, forming a plane between the first substrate and the second substrate,
    the first deformation is positioned in the second substrate and resists axial movement by the nail, and
    the second deformation intersects the plane and resists shear movement by the first substrate relative to the second substrate.

18. The fastened assembly according to claim 17, wherein the first deformation creates a first bore, and the second deformation contacts the first bore.

19. The fastened assembly according to claim 17, wherein the first deformation has a first dimension measured from a shank center, the second deformation has a second dimension measured from the shank center, and the second dimension is greater than or equal to the first dimension.

20. The fastened assembly according to claim 17, wherein the first deformation comprises at least one annular ring.

21. The fastened assembly according to claim 17, wherein the first deformation comprises at least one ridge defining a helix around the longitudinal axis.

22. The fastened assembly of claim 17, wherein the axial gap between the first deformation and the second deformation has a smooth surface.

23. A fastened assembly, comprising:
a nail with a total axial length, the nail comprising:
an elongate shank with a longitudinal axis, a first end and a second end;
a head positioned at the first end;
a tip positioned at the second end;
a first deformation formed on the shank;
a second deformation formed on the shank and positioned between the head and the first deformation, the second deformation comprising at least one ridge defining a helix around the longitudinal axis;
a first substrate; and
a second substrate,
wherein the nail fastens the first substrate in abutment with the second substrate, a plane being formed between the first substrate and the second substrate,
the first deformation resists axial movement by the nail, the first deformation being positioned in the second substrate and axially spaced from the plane by at least approximately 25% of the total axial length, and
the second deformation resists shear movement by the first substrate relative to the second substrate, the second deformation being positioned to intersect the plane and extending axially in both directions from the plane by at least approximately 10% of the total axial length.

24. The fastened assembly according to claim 23, wherein the first deformation comprises at least one annular ring.

25. The fastened assembly according to claim 23, wherein the first deformation comprises at least one ridge defining a helix around the longitudinal axis.

26. A nail for joining two substrates, the nail having a total axial length, the nail comprising:
an elongate shank with a longitudinal axis, a first end and a second end;
a head positioned at the first end;
a tip positioned at the second end;
a first deformation formed on the shank; and
a second deformation formed on the shank and positioned between the head and the first deformation, the second deformation comprising at least one ridge defining a helix around the longitudinal axis,
wherein the second deformation has an intersection portion for intersecting a plane formed by the two substrates, the second deformation extending axially in both directions from the intersection portion by at least approximately 10% of the total axial length of the nail, and
the first deformation is spaced from the intersection portion by at least approximately 25% of the total axial length.

27. The fastened assembly according to claim 26, wherein the first deformation comprises at least one annular ring.

28. The fastened assembly according to claim 26, wherein the first deformation comprises at least one ridge defining a helix around the longitudinal axis.

* * * * *